(12) United States Patent
Qiu

(10) Patent No.: US 11,914,978 B2
(45) Date of Patent: Feb. 27, 2024

(54) SYSTEMS AND METHODS FOR CODE OPTIMIZATION

(71) Applicant: ZHEJIANG DAHUA TECHNOLOGY CO., LTD., Zhejiang (CN)

(72) Inventor: Gaoyuan Qiu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/452,530

(22) Filed: Aug. 19, 2023

(65) Prior Publication Data

US 2023/0393823 A1    Dec. 7, 2023

Related U.S. Application Data

(63) Continuation of application No. PCT/CN2021/131380, filed on Nov. 18, 2021.

(30) Foreign Application Priority Data

Mar. 23, 2021 (CN) .......................... 202110310832.3

(51) Int. Cl.
G06F 9/38 (2018.01)
G06F 8/41 (2018.01)

(52) U.S. Cl.
CPC ............ *G06F 8/443* (2013.01); *G06F 9/3804* (2013.01)

(58) Field of Classification Search
CPC ...................................................... G06F 8/443

(Continued)

(56) References Cited

U.S. PATENT DOCUMENTS 5,896,521 A * 4/1999 Shackleford et al. .. G06F 30/30
717/151
6,161,217 A * 12/2000 Detlefs et al. ........ G06F 9/4491
717/151

(Continued)

FOREIGN PATENT DOCUMENTS

CN    101266549 A    9/2008
CN    102306093 A    1/2012

(Continued)

OTHER PUBLICATIONS

First Office Action in Chinese Application No. 202110310832.3 dated Apr. 20, 2022, 25 pages.

(Continued)

*Primary Examiner* — Wei Y Zhen
*Assistant Examiner* — Mohammed N Huda
(74) *Attorney, Agent, or Firm* — METIS IP LLC

(57) ABSTRACT

The present disclosure relates to systems and methods for code optimization. The methods include generating, based on a first macro of a user code, an assembly code corresponding to the user code. The first macro includes one or more parameters relating to one or more branch codes, and the assembly code includes assembly branch codes corresponding to the branch codes and jump codes corresponding to the assembly branch codes. The methods further include obtaining, based on a second macro of the user code, target information for identifying an execution condition of the one or more branch codes, and determining, based on the assembly code and the target information, a compiled user code. When being executed, the compiled user code may call, based on the target information, a procedure to determine a value of the execution condition. The procedure is configured to modify an execution flow of the compiled user code.

18 Claims, 12 Drawing Sheets

(58) Field of Classification Search
USPC .......................................................... 717/151
See application file for complete search history.

(56) References Cited

U.S. PATENT DOCUMENTS

| | | | |
|---|---|---|---|
| 2005/0210224 | A1 | 9/2005 | Col et al. |
| 2010/0205405 | A1 | 8/2010 | Jin et al. |
| 2011/0138351 | A1* | 6/2011 | Monsifrot et al. ...... G06F 21/14 717/100 |
| 2013/0024675 | A1 | 1/2013 | Lovett et al. |
| 2015/0186170 | A1 | 7/2015 | Jennings et al. |
| 2017/0262287 | A1 | 9/2017 | Abdallah |

FOREIGN PATENT DOCUMENTS

| | | |
|---|---|---|
| CN | 102981886 A | 3/2013 |
| CN | 103699820 A | 4/2014 |
| CN | 103870249 A | 6/2014 |
| CN | 104035825 A | 9/2014 |
| CN | 105718241 A | 6/2016 |
| CN | 107194246 A | 9/2017 |
| CN | 109141207 A | 1/2019 |
| CN | 111258649 A | 6/2020 |
| CN | 111428327 A | 7/2020 |
| CN | 112905242 A | 6/2021 |
| CN | 113076136 A | 7/2021 |

OTHER PUBLICATIONS

Li, Dan et al., Recognition of Indirect Jump Targets Based on Trace Constraint, Computer Science, 40(6): 315-319, 2013.
International Search Report in PCT/CN2021/131380 dated Feb. 15, 2022, 5 pages.
Written Opinion in PCT/CN2021/131380 dated Feb. 15, 2022, 4 pages.

* cited by examiner

SYSTEMS AND METHODS FOR CODE OPTIMIZATION

CROSS-REFERENCE TO RELATED APPLICATIONS

This application is a continuation of International Application No. PCT/CN2021/131380, filed on Nov. 18, 2021, which claims priority to Chinese Patent Application No. 202110310832.3, filed on Mar. 23, 2021, the contents of which are incorporated herein by reference in their entirety.

TECHNICAL FIELD

The present disclosure generally relates to computer field, and in particular, to systems and methods for code optimization.

BACKGROUND

The pipelining technique has been widely used in a processor for improving the instruction throughput of the processor and program execution efficiency of the processor. Meanwhile, a branch prediction mechanism is used to predict execution of one or more condition branches in a program to realize a branch taken to efficiently utilizes the pipelines. However, when a branch prediction is failed, pipelines after the predicted condition branch may be emptied, which increases the prediction cost. Therefore, it is desirable to provide effective systems and methods for code optimization to optimize the branch taken.

SUMMARY

An aspect of the present disclosure relates to a system for code optimization. The system may include at least one storage medium including a set of instructions and at least one processor in communication with the at least one storage medium. When executing the set of instructions, the at least one processor may be directed to cause the system to generate, based on a first macro of a user code, an assembly code corresponding to the user code. The first macro may include one or more parameters relating to one or more branch codes, and the assembly code may include one or more assembly branch codes corresponding to the one or more branch codes and one or more jump codes corresponding to the one or more assembly branch codes. The at least one processor may be directed to cause the system further to obtain, based on a second macro of the user code, target information for identifying an execution condition of the one or more branch codes, and determine, based on the assembly code and the target information, a compiled user code. When being executed, the compiled user code may call, based on the target information, a procedure to determine a value of the execution condition. The procedure may be configured to modify an execution flow of the compiled user code.

In some embodiments, to generate, based on a first macro of a user code, an assembly code corresponding to the user code, the at least one processor may be directed to cause the system to generate the assembly code based on an inline assembly technique.

In some embodiments, at least one of the one or more jump codes may include a code segment generated based on the first macro and a jump instruction. The jump instruction may be configured to cause the compiled user code to jump to a corresponding assembly branch code of the one or more assembly branch codes based on the target information.

In some embodiments, the at least one of the one or more jump codes may include a code configured to write operation address information into a storage address identified by the target information.

In some embodiments, the operation address information may include a program counter (PC) register address.

In some embodiments, to cause the compiled user cod to jump to a corresponding assembly branch code of the one or more assembly branch codes based on the target information, the at least one processor may be directed to cause the system to determine the jump instruction based on a value in the storage address, and cause the assembly code to jump to the corresponding assembly branch code based on the jump instruction.

In some embodiments, the at least one of the one or more jump codes may include a code configured to write the jump instruction into the storage address.

In some embodiments, to obtain, based on a second macro of the user code, target information, the at least one processor may be directed to cause the system to determine whether a parameter of the second macro includes the target information, and in response to determining that the parameter of the second macro includes the target information, determine the target information based on the parameter of the second macro, or in response to determining that the second macro does not include a parameter that includes the target information, determine predetermined information as the target information.

In some embodiments, the compiled user code calling, based on the target information, a procedure to determine a value of the execution condition may include determining an address of an original jump instruction based on the target information, generating a modified jump instruction based on the address of the original jump instruction, and performing a replacement of the original jump instruction using the modified jump instruction.

In some embodiments, the performing the replacement of the original jump instruction using the modified jump instruction may include finishing the replacement of the modified jump instruction using the original jump instruction by performing a refresh instruction.

In some embodiments, to generate, based on a first macro of a user code, an assembly code corresponding to the user code, the at least one processor may be directed to cause the system to generate the one or more jump codes based on an operation platform of the one or more jump codes.

An aspect of the present disclosure relates to a method for code optimization. The method may be implemented on a computing device including at least one processor and at least one storage. The method may include generating, based on a first macro of a user code, an assembly code corresponding to the user code. The first macro may include one or more parameters relating to one or more branch codes, and the assembly code may include one or more assembly branch codes corresponding to the one or more branch codes and one or more jump codes corresponding to the one or more assembly branch codes. The method may further include obtaining, based on a second macro of the user code, target information for identifying an execution condition of the one or more branch codes, and determining, based on the assembly code and the target information, a compiled user code. When being executed, the compiled user code may call, based on the target information, a procedure to determine a value of the execution condition. The procedure may be configured to modify an execution flow of the compiled user code.

In some embodiments, the generating, based on a first macro of a user code, an assembly code corresponding to the user code may include generating the assembly code based on an inline assembly technique.

In some embodiments, at least one of the one or more jump codes may include a code segment generated based on the first macro and a jump instruction. The jump instruction may be configured to cause the compiled user code to jump to a corresponding assembly branch code of the one or more assembly branch codes based on the target information.

In some embodiments, the at least one of the one or more jump codes may include a code configured to write operation address information into a storage address identified by the target information.

In some embodiments, the operation address information may include a program counter (PC) register address.

In some embodiments, the causing the compiled user cod to jump to a corresponding assembly branch code of the one or more assembly branch codes based on the target information may include determining the jump instruction based on a value in the storage address, and causing the assembly code to jump to the corresponding assembly branch code based on the jump instruction.

In some embodiments, the at least one of the one or more jump codes may include a code configured to write the jump instruction into the storage address.

In some embodiments, the obtaining, based on a second macro of the user code, target information may include determining whether a parameter of the second macro includes the target information, and in response to determining that the parameter of the second macro includes the target information, determining the target information based on the parameter of the second macro, or in response to determining that the second macro does not include a parameter that includes the target information, determining predetermined information as the target information.

In some embodiments, the compiled user code calling, based on the target information, a procedure to determine a value of the execution condition may include determining an address of an original jump instruction based on the target information, generating a modified jump instruction based on the address of the original jump instruction, and performing a replacement of the original jump instruction using the modified jump instruction.

In some embodiments, the performing the replacement of the original jump instruction using the modified jump instruction may include finishing the replacement of the modified jump instruction using the original jump instruction by performing a refresh instruction.

In some embodiments, the generating, based on a first macro of a user code, an assembly code corresponding to the user code may include generating the one or more jump codes based on an operation platform of the one or more jump codes.

A further aspect of the present disclosure relates to a non-transitory computer readable medium comprising executable instructions that, when executed by at least one processor, direct the at least one processor to perform a method. The method may include generating, based on a first macro of a user code, an assembly code corresponding to the user code. The first macro may include one or more parameters relating to one or more branch codes, and the assembly code may include one or more assembly branch codes corresponding to the one or more branch codes and one or more jump codes corresponding to the one or more assembly branch codes. The method may further include obtaining, based on a second macro of the user code, target information for identifying an execution condition of the one or more branch codes, and determining, based on the assembly code and the target information, a compiled user code. When being executed, the compiled user code may call, based on the target information, a procedure to determine a value of the execution condition. The procedure may be configured to modify an execution flow of the compiled user code.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
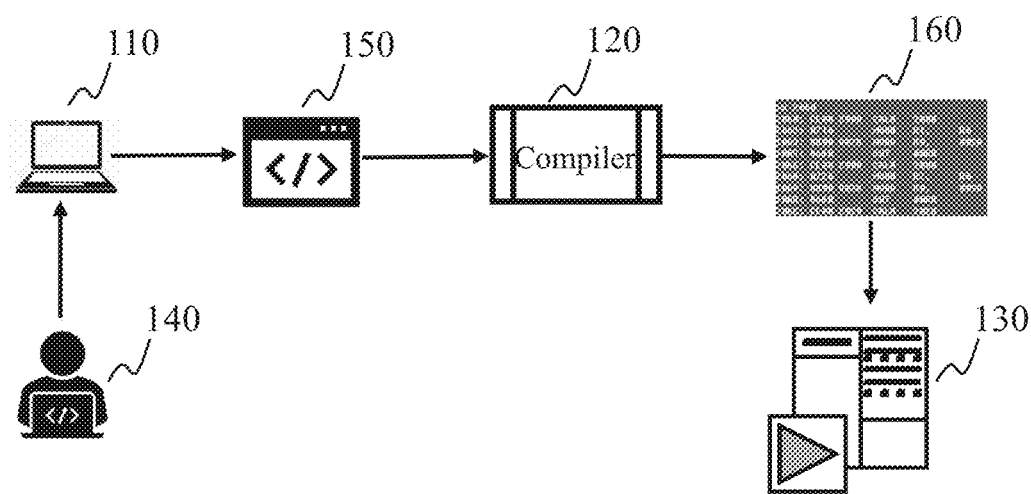
FIG. 1 is a schematic diagram illustrating an exemplary code optimization system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for code optimization. The systems may generate, based on a first macro of a user code, an assembly code corresponding to the user code. The first macro may include one or more parameters relating to one or more branch codes, and the assembly code may include one or more assembly branch codes corresponding to the one or more branch codes and one or more jump codes corresponding to the one or more assembly branch codes. The systems may further obtain, based on a second macro of the user code, target information for identifying an execution condition of the one or more branch codes. A compiled user code may be determined based on the assembly code and the target information. For example, the compiled user code may include the assembly code and the target information. When being executed, the compiled user code may call, based on the target information, a procedure to determine a value of the execution condition. The procedure may be configured to modify an execution flow of the user code.

According to the systems and methods for code optimization, the one or more branch codes may be embedded into the assembly code based on the first macro in the user code. In such cases, the user code may be modified and the compiled user code including the assembly code may be obtained, which may reduce the programming overhead. The one or more branch codes may be embedded into the execution flow of the compiled user code such that the one or more branch codes may be executed in the compiled user code without affecting an execution of other parts of the compiled user code. Further, the target information for identifying an execution condition of the one or more branch codes may be used to determine a value of the execution condition (e.g., an address of a jump instruction). In such cases, the execution condition (e.g., the jump instruction) may be located accurately. And the compiled user code may be caused to jump to a corresponding branch code based on the execution condition without performing a branch prediction process, branch.

FIG. 1 is a schematic diagram illustrating an exemplary code optimization system according to some embodiments of the present disclosure.

The code optimization system may be used in a processor (e.g., a central processing unit, CPU) executing a program. A pipeline may be used in the processor to allow overlapping execution of multiple instructions to achieve instruction parallelism and improve the instruction throughput of the processor. And the longer the pipeline, the faster an average speed of the processor to execute an instruction. The pipeline may include various stages with a certain relationship between them. A collapse of an upper-stage pipeline may lead to a reconstruction of a lower-stage pipeline. In some embodiments, a pipeline of a user code (or a program) may include one or more branches implemented with a conditional jump instruction. For example, a branch taken process of a pipeline including two branches may include two approaches: not taken (i.e., executing subsequent instructions in sequence) or taken (jumping to another instruction address). Whether to jump to another instruction address may be determined after an execution stage of the conditional jump instruction is passed in the pipeline. To utilize the pipeline, a branch prediction mechanism may be used to estimate whether the conditional jump is most likely to be taken or not taken. The branch that is estimated to be the most likely may be then executed in advance. If the estimation is correct, the pipeline may continue to operate, otherwise the lower-stage pipelines after the branch may be cleared.

Figure 2:
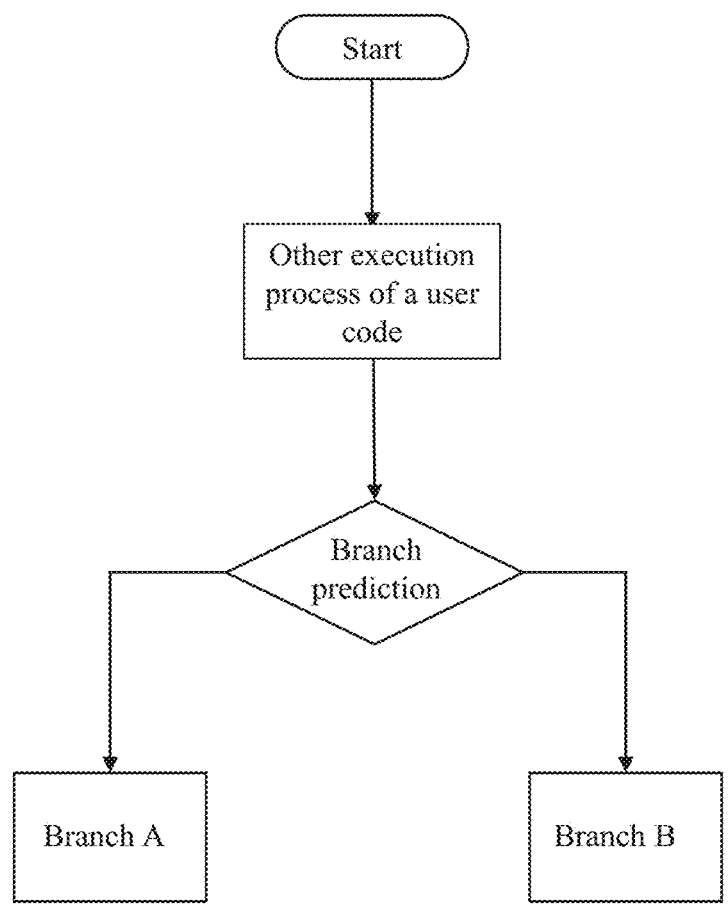
FIG. 2 is a schematic diagram illustrating an exemplary process of branch taken according to some embodiments of the present disclosure.

In some embodiments, a branch prediction operation may be performed before the branch taken. For example, FIG. 2 is a schematic diagram illustrating an exemplary process of branch taken according to some embodiments of the present disclosure. As shown in FIG. 2, a branch taken process 200 may include a branch prediction operation before a branch A or branch B is executed. That is, the processor may perform a branch prediction operation before executing branch A or branch B.

Figure 3:
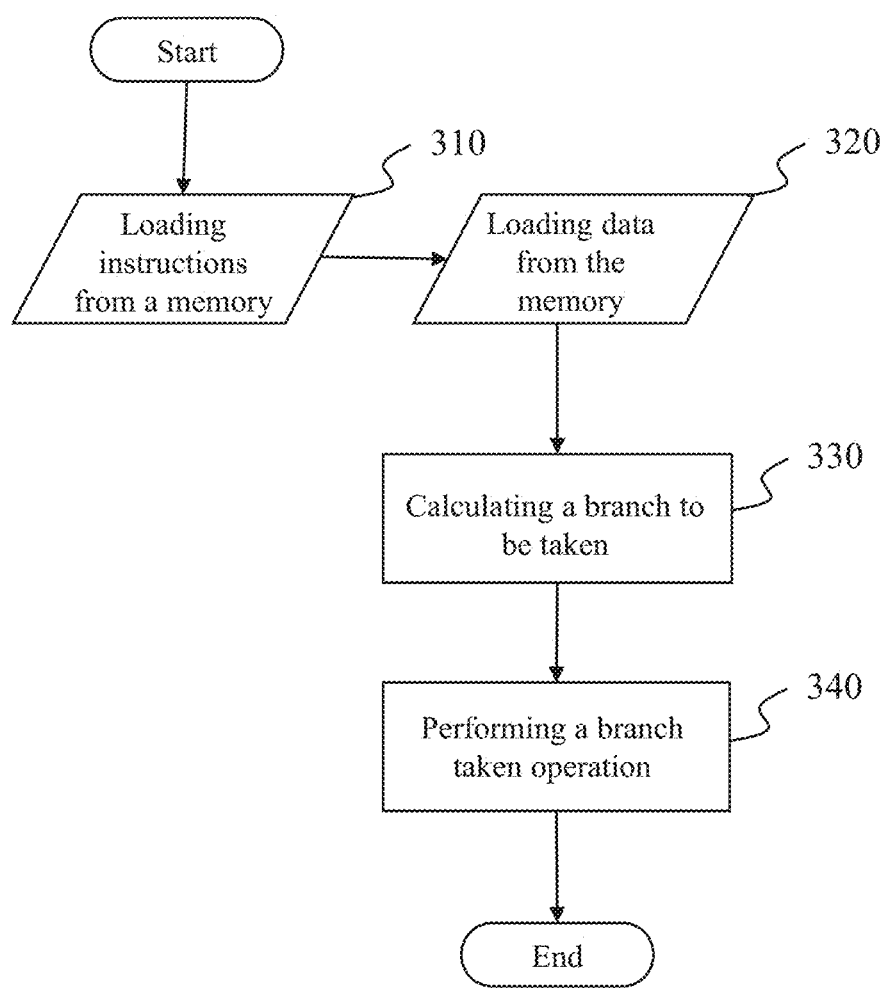
FIG. 3 is a schematic diagram illustrating an exemplary process of branch prediction according to some embodiments of the present disclosure.

FIG. 3 is a schematic diagram of illustrating an exemplary process of branch prediction according to some embodiments of the present disclosure. As shown in FIG. 3, a branch prediction process 300 may include following operations.

In 310, instructions may be loaded from memory, which is an inevitable operation. In 320, data may be loaded from the memory. In 330, a branch to be taken may be calculated. In 340, a branch taken operation may be performed.

In the branch prediction, a data access cost may be generated in the operation of loading data in operation 320. Exemplary costs may include a clock delay of the processor. For example, if the data is stored in an L1 cache, one clock delay may be generated in the operation of loading data. As another example, if the data is stored in a storage medium such as memory, thousands of clock delays may be generated in the operation of loading data. A reconstruction cost of the pipeline may be generated in response to a calculation result of operation 330. For example, if a branch calculated (or predicted) in operation 330 is correct, the reconstruction cost may not be generated, otherwise (i.e., the branch calculated in operation 330 is wrong), hundreds of clock delays may be generated. A specific amount of clock delays generated when the branch calculated in operation 330 is wrong may be related to a count of the stages of the pipeline.

According to the branch taken process shown in FIG. 2 and FIG. 3, the branch prediction may be performed before the branch taken, which may slow down a speed of the execution of the user code. Moreover, a wrong prediction of the branch to be executed may generate the reconstruction cost of the pipeline, which may reduce the efficiency of the execution of the user code.

In some embodiments, a more efficient built-in branch predictor may be used in the processor for branch prediction, thereby reducing the reconstruction cost of the pipeline. In some embodiments, a state machine, a function pointer, etc. may be used to load a branch to be executed, so as to reduce or remove the conditional jump instructions in a coding stage of the user code, thereby removing the branch taken process. However, the use of the state machine, the function pointer, etc. may read data from the memory, which may introduce data access. In some embodiments, for a user code in compiled languages, a profile-guided optimization of a compiler may be performed to mark branches that have been executed more often as frequently taken branches, so as to reduce the probability of prediction when initially predicting the branch to be executed. However, the profile-guided optimization does not remove the branch taken process. In some embodiments, for a user code in interpreted languages, an interpreter may record the branch taken history during the executions of historical user codes, and generate a user code with higher efficiency based on the branch taken history. However, the optimization for a user code in interpreted languages does not remove the branch taken process.

According to some embodiments of the present disclosure, the code optimization system 100 may be provided for code optimization. In a code optimization, the code optimization system 100 may actively modify execution conditions during an execution of a user code, thereby modifying an execution flow of the user code in real-time. For example, the code optimization system 100 may insert one or more branch codes corresponding to one or more branches into an assembly code. Further, the code optimization system 100 may insert the assembly code into the user code to obtain a compiled user code. In such cases, during an execution of the compiled user code, a branch taken may be actively performed to modify an execution flow of the compiled user code. As used herein, the optimization of a user code may include that the one or more branch codes may be embedded into an execution flow of the compiled user code such that the one or more branch codes may be executed in the compiled user code without affecting an execution of other parts of the compiled user code and without performing a branch prediction process, which may avoid frequent branch jumps caused by wrong branch predictions.

As illustrated, the code optimization system 100 may include a user device 110, a compiler 120, and a terminal 130.

The user device 110 may be used by a user 140 for generating a user code 150 of a program. For example, the user 140 may write the user code 150 of the program based on programming languages using the user device 110. Exemplary user device 110 may include a laptop computer, a desktop computer, or the like, or any combination thereof. Exemplary programming languages may include C. C++, Java, or the like, or any combination thereof.

The user code 150 may include a set of instructions for controlling a processor. For example, each instruction of the set of instructions may be used to cause the processor to perform a specific task. In some embodiments, the user code 150 may include one or more macros for implementing one or more functions. For example, a first macro of the one or more macros may include one or more parameters relating to one or more branch codes. The one or more branch codes may correspond to one or more branches and may need to be embedded into the user code 150. The first macro may be compiled to generate an assembly code including assembly branch codes corresponding to one or more branch codes such that the one or more branch codes may be embedded into the user code 150. As another example, the first macro may further include one or more jump codes configured to implement the branch taken. The assembly code generated based on the first macro may include the one or more jump codes corresponding to the one or more assembly branch codes. As a further example, at least one (e.g., a second macro) of the one or more macros may be used to obtain target information. In such cases, a compiled user code 160 may be obtained based on the assembly code and the target information. When being executed, the compiled user code 160 may call a procedure (e.g., a branch switching procedure) at a certain position of the compiled user code 160 to switch a branch to be executed by the processor, thereby modifying an execution flow of the compiled user code 160. The procedure may be configured to modify an execution flow of the compiled user code 160. In some embodiments, a programming language of at least a portion of codes in the one or more macros (e.g., the first macro, the second macro) may be different from a programming language of the user code 150. For example, the programming language of the at least a portion of the codes in the one or more macros may include an assembly language, and the programming language of the user code 150 may include a C language. In some embodiments, the user code 150 may include a code for calling the procedure (e.g., the branch switching procedure). In some embodiments, the one or more macros and/or the code for calling the procedure may be pre-written and stored in a storage device (e.g., a storage of the code optimization system 100, or an external storage). The user device 110 may obtain the one or more macros and/or the code for calling the procedure from the storage device.

The compiler 120 may be used to generate the compiled user code 160 by compiling the user code 150. For example, the compiler 120 may generate the assembly code based on the one or more macros in the user code 150. In a compilation process, the compiler 120 may generate the assembly code by deploying the first macro in the user code 150, and processing the code in the non-assembly language (C, C++, etc.) in the user code 150. In some embodiments, the assembly code may include a code in an assembly language. In some embodiments, the assembly code may include an intermediate code in the compilation process, such as a byte code, etc. In some embodiments, the assembly code generated by the compiler 120 may include one or more assembly branch codes and one or more jump codes corresponding to the one or more assembly branch codes. The one or more jump codes may include a code segment generated based on the first macro and a jump instruction. The assembly code may further include a code used for generating a storage address. The storage address may be configured to store the jump instruction. In some embodiments, the compiler 120 may obtain information based on the one or more macros in the user code 150. For example, the compiler 120 may obtain the one or more branch codes based on the first macro. As another example, the compiler 120 may obtain the target information for determining a value of an execution condition of the one or more branch codes (also referred to as a branch execution condition) based on the second macro. In such cases, the user code 150 may be compiled by the compiler 120 and the compiled user code 160 including the assembly code and the target information may be obtained.

In some embodiments, the compiler 120 may include one or more modules such as an assembler, a linker, or the like, or any combination thereof. The one or more modules may be configured to generate an executable application based on the compiled user code 160. For example, the compiler 120 may generate, based on a preset compilation condition, an application executable on a specific operation platform. The application may be executed on an operation platform that is the same as or compatible with the specific operation platform. In some embodiments, the specific operation platform may be determined by setting a compilation condition for a compiler or using a specific compiler. In some embodiments, the specific operation platform may be the same as or different from that of the compiler 120. For example, the compiler 120 may operate on the Intel/Windows platform, and the application generated by the compiler 120 may be executed on the Intel/Windows platform or the arm/Android platform.

In some embodiments, the code optimization system 100 may include a processing device (not shown). The processing device may process information and/or data relating to the code optimization to perform one or more functions described in the present disclosure. In some embodiments, the processing device may be the same device as the processor that executes the user code 150 or the compiled user code 160. In some embodiments, the processing device may be different from the processor. For example, the processing device may be configured to generate the compiled user code 160, and the processor may be configured to execute the compiled user code 160. In some embodiments, the compiler 120 may be integrated into the processing device. When the processing device performs the one or more functions described in the present disclosure, the compiler 120 may be used to generate the compiled user code 160 by compiling the user code 150.

The terminal 130 may be configured to execute the application (or the compiled user code 160) generated based on the user code 150. The terminal 130 may include a processor (e.g., the processor executing the user code 150 or the compiled user code 160). Merely by way of example, the processor may include a central processing unit (CPU), an application-specific integrated circuit (ASIC), an application-specific instruction-set processor (ASIP), a graphics processing unit (GPU), or the like, or any combination thereof. The processor may be configured to execute various applications or codes based on the pipelining technique. In some embodiments, the processor may predict a branch (or a branch code) to be executed based on the branch prediction mechanism. If the predicted branch is wrong, the processor may restore correctly by reconstructing the pipeline of the processor. In some embodiments, the terminal 130 may execute the application generated based on the compiled user code 160 to implement functions corresponding to the user code 150. In some embodiments, when the terminal 130 executes the application, the terminal 130 may perform a branch taken actively by modifying the jump instruction in the storage address, thereby modifying an execution flow of the pipeline or the compiled user code. The terminal 130 may include a mobile phone, a laptop computer, a desktop computer, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. However, these changes and modifications do not deviate from the scope of this application. For example, the code optimization system 100 may further include a storage device configured to store data and/or instructions that the processor may execute or use to perform exemplary methods described in the present disclosure.

Figure 4:
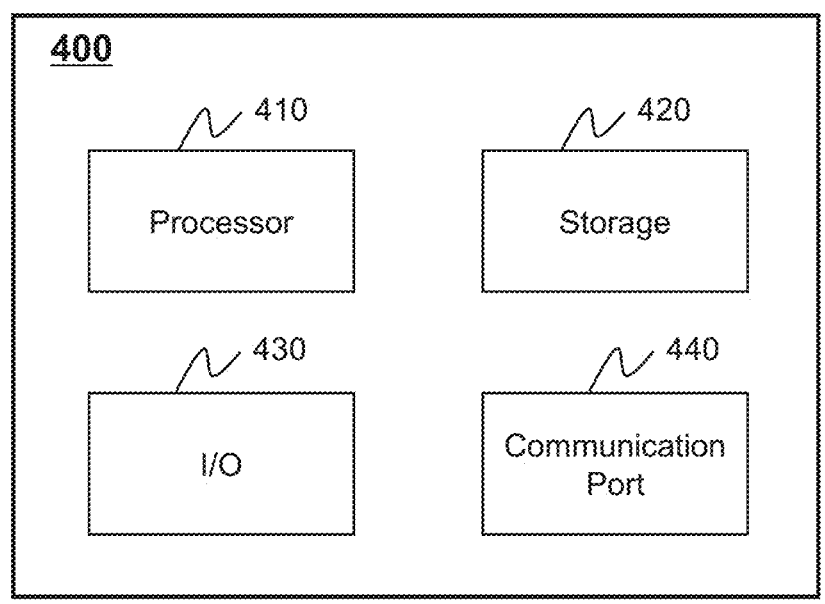
FIG. 4 is a schematic diagram illustrating exemplary hardware and/or software components of an exemplary computing device according to some embodiments of the present disclosure.

The systems and methods provided in the present disclosure may be implemented on a computing device such as a mobile terminal, a computer, or the like, or any combination thereof. FIG. 4 is a schematic diagram illustrating exemplary hardware and/or software components of an exemplary computing device according to some embodiments of the present disclosure. In some embodiments, the processing device of the code optimization system 100 may be implemented on the computing device 400. As illustrated in FIG. 4, the computing device 400 may include a processor 410, a storage 420, an input/output (I/O) 430, and a communication port 440.

The processor 410 may execute computer instructions (program code) and perform functions of the processing device in accordance with techniques described herein. For example, the processor 410 may generate a compiled user code based on a user code. In some embodiments, the processor 410 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 400. However, it should be noted that the computing device 400 in the present disclosure may also include multiple processors, and thus operations of a method that are performed by one processor as described in the present disclosure may also be jointly or separately performed by the multiple processors. For example, if in the present disclosure the processor of the computing device 400 executes both operations A and B, it should be understood that operations A and B may also be performed by two different processors jointly or separately in the computing device 400 (e.g., a first processor executes operation A and a second processor executes operation B, or the first and second processors jointly execute operations A and B).

The storage 420 may store data and/or instructions that the processor 410 may execute or use to perform exemplary methods described in the present disclosure. For example, the storage 420 may store computer instructions (program code) that are used for code optimization. As another example, the storage 420 may store one or more macros for implementing the code optimization. As a further example, the storage 420 may store a code for calling a procedure (e.g., a branch switching procedure). In some embodiments, the storage 420 may include a mass storage device, a removable storage device, a volatile read-and-write memory, a read-only memory (ROM), or the like, or any combination thereof.

The I/O 430 may input or output signals, data, or information. In some embodiments, the I/O 430 may enable user interaction with the processing device. In some embodiments, the I/O 430 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof.

The communication port 440 may be connected to a network (e.g., a network of the code optimization system 100) to facilitate data communications. The communication port 440 may establish connections between the processing device (or the compiler) and the user device 110, the terminal 130, or any other component of the code optimization system 100. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, etc.), radio frequency (RF), or the like, or a combination thereof. For example, the communication port 440 may include a Network interface controller (NIC) that may be connected to other network devices through a base station to communicate with the Internet.

Figure 5:
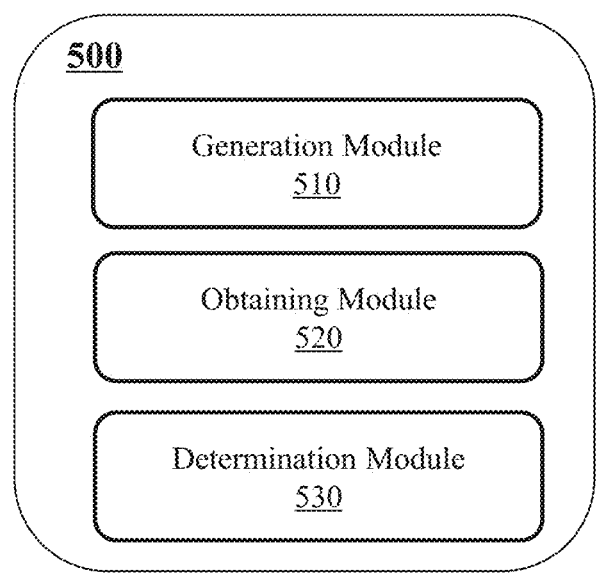
FIG. 5 is a block diagram illustrating an exemplary processing device according to some embodiments of the present disclosure.

FIG. 5 is a block diagram illustrating an exemplary processing device according to some embodiments of the present disclosure. In some embodiments, the processing device 500 may be implemented on various devices (e.g., a computing device used to implement any component of the code optimization system 100). In some embodiments, the branch taken device 1200 illustrated in FIG. 12 may be integrated into the processing device 500. As shown in FIG. 5, the processing device 500 may include a generation module 510, an obtaining module 520, and a determination module 530.

The generation module 510 may be configured to generate, based on a first macro of a user code, an assembly code corresponding to the user code. The first macro may be used for identifying a code specified by the user (e.g., a branch code, a loop code, etc.). For example, the first macro may include one or more parameters relating to one or more branch codes. In some embodiments, to generate the assembly code, the generation module 510 may receive the one or more branch codes using the one or more parameters of the first macro. Further, the generation module 510 may generate the assembly code by performing a compilation operation based on the first macro and the one or more branch codes. For example, the first macro may include an initial assembly code. The generation module 510 may embed the one or more branch codes into the initial assembly code of the first macro based on an inline assembly technique. In some embodiments, the assembly code may include one or more assembly branch codes corresponding to the one or more branch codes and one or more jump codes corresponding to the one or more assembly branch codes. At least one of the one or more jump codes may include a code segment generated based on the first macro and one or more jump instructions. In some embodiments, the one or more jump codes may be generated based on an operation platform of the one or more jump codes. In some embodiments, at least one of the one or more jump codes in the assembly code may include a code segment generated based on the first macro and a jump instruction. In some embodiments, at least one of the one or more jump codes may include a code configured to write operation address information (e.g., a program counter (PC) register address) into the storage address identified by the target information.

The obtaining module 520 may be configured to obtain, based on a second macro of the user code, target information for identifying an execution condition of the one or more branch codes.

The determination module 530 may be configured to determine, based on the assembly code and the target information, a compiled user code. The compiled user code refers to a compiled or optimized code corresponding to the user code. The compiled user code may include the assembly code and the target information.

The second macro may be used to receive information such as a variable name, an identity of a storage address, or the like, or any combination thereof. The target information refers to pre-determined information (e.g., information pre-determined by a user) that is used for determining a jump path. In some embodiments, the obtaining module 520 may determine, based on the target information, a storage address used during an execution of a code (e.g., the compiled user code). In some embodiments, the target information may be used for identifying an execution condition (e.g., a jump instruction) of the one or more branch codes. When the compiled user code is executed, the compiled user code may call, based on the target information, a procedure to determine a value of the execution condition. For example, the target information may identify a storage address for storing an address of the jump instruction. When the compiled user code is executed, the compiled user code may call, based on the target information, a procedure to determine a value of the execution condition. In the procedure, a modified jump instruction may be generated. The modified jump instruction may be used to replace an original jump instruction in the address of the jump instruction. In such cases, the compiled user code may jump to a branch based on the modified jump instruction. Correspondingly, the execution flow of the compiled user code may be modified according to the procedure.

In some embodiments, to obtain the target information, the obtaining module 520 may determine whether a parameter of the second macro includes the target information. In response to determining that the parameter of the second macro includes the target information, the obtaining module 520 may determine the target information based on the parameter of the second macro. In response to determining that the second macro does not include a parameter that includes the target information, the obtaining module 520 may determine predetermined information as the target information. The predetermined information may be included in the second macro, or may be predetermined and stored in a storage device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 500 may include one or more additional modules, such a storage module (not shown) for storing data.

Figure 6:
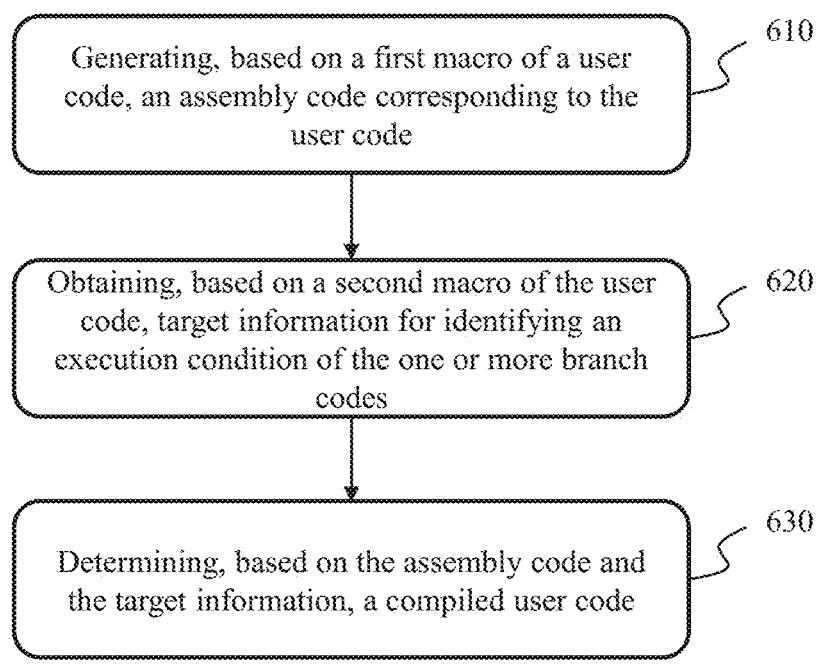
FIG. 6 is a flowchart illustrating an exemplary process for code optimization according to some embodiments of the present disclosure.

FIG. 6 is a flowchart illustrating an exemplary process for code optimization according to some embodiments of the present disclosure. In some embodiments, the process 600 may be implemented by a code optimization system (e.g., the code optimization system 100). In some embodiments, the code optimization system may be implemented by software and/or hardware, and/or may be integrated in a code optimization device. In some embodiments, at least part of process 600 may be performed by the processing device 500 (implemented in, for example, the computing device 400 shown in FIG. 4). For example, the process 600 may be stored in a storage device (e.g., the storage 420) in the form of instructions (e.g., an application), and invoked and/or executed by the processing device 500 (e.g., the processor 410 illustrated in FIG. 4, one or more modules or units illustrated in FIG. The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the processing device 500 (e.g., the generation module 510) may generate, based on a first macro of a user code, an assembly code corresponding to the user code.

The user code refers to a source code provided by a user to implement a target of the user. For example, the user code may include a set of instructions for controlling a processor. Each instruction of the set of instructions may be used to cause the processor to perform a specific task. The source code may be written in a programming language. Exemplary programming languages may include C, C++, Java, Python, Basic, JavaScript, or the like, or any combination thereof. In some embodiments, the user code may be written in a compilation language such as C, C++, Java, etc. The user code in the compilation language may be compiled by a compiler before executed. In some embodiments, the user code may be written in languages that support macros, such as C, C++, Python, etc.

As used herein, a macro refers to a source code (e.g., a set of instructions, or a segment of source code in the user code). A compiler (e.g., the compiler 120) may perform a compilation operation (e.g., a replacement) based on the macro. The macro may include parameters or not include parameters. In some embodiments, the user code may include one or more macros. For example, the user code may include a macro for embedding one or more branch codes into the user code. As another example, the user code may include a macro for generating a storage address based on target information.

The first macro may be used for identifying a code specified by the user. For example, the first macro may include one or more parameters relating to the code specified by the user. The code specified by the user may include one or more branch codes, one or more loop codes, or the like, or any combination thereof. The branch code refers to a code that is executed based on a branch taken process or an execution condition. For example, the branch code may include a branch in a branch selection code, a loop code that satisfies an execution condition, or the like, or any combination thereof. In some embodiments, the branch code may include a source code written in a programming language. In some embodiments, the branch code may be written in a programming language same as that of the user code. In some embodiments, the branch code may be written in a programming language different from that of the user code in a case that the programming language is supported by the compiler. In some embodiments, the first macro may include one or more parameters relating to the one or more branch codes. For example, a value of each of the or more parameters may be a branch code. As another example, the first macro may include a parameter of a value JSON. The parameter may include a plurality of branch codes.

In some embodiments, the first macro may include a plurality of sub-macros. The plurality of sub-macros may be associated with each other. For example, the plurality of sub-macros may have the same features (e.g., same parameters, same identifiers, etc.). The first macro may be obtained by combining the plurality of sub-macros that have the same features. In some embodiments, at least one of the plurality of sub-macros may be used to receive a code. For example, a sub-macro may receive a branch code. In some embodiments, a sub-macro may be used to generate a portion of the assembly code. The portions of the assembly code corresponding to the plurality of sub-macros may be used to implement different functions. For example, a sub-macro may be used to generate one or more jump codes, and another sub-macro may be used to generate one or more assembly branch codes.

In some embodiments, to generate the assembly code, the processing device 500 may receive the one or more branch codes using the one or more parameters of the first macro. For example, the processing device 500 may receive the one or more branch codes input by the user and set the one or more branch codes to the values of the parameter. Further, the processing device 500 may generate the assembly code by performing a compilation operation based on the first macro and the one or more branch codes. For example, the first macro may include an initial assembly code. The processing device 500 may embed the one or more branch codes into the initial assembly code of the first macro based on an inline assembly technique. In some embodiments, the compilation operation may be performed using a compiler (e.g., the compiler 120). In some embodiments, the assembly code may be generated independently relative to the user code. Further, the processing device 500 may embed the assembly code into the user code. For example, the processing device 500 may embed the assembly code into the user code by invoking a function or a procedure.

In some embodiments, the assembly code may include one or more assembly branch codes corresponding to the one or more branch codes and one or more jump codes corresponding to the one or more assembly branch codes. At least one of the one or more jump codes may include a code segment generated based on the first macro and one or more jump instructions. In some embodiments, the one or more jump codes may be generated based on an operation platform of the one or more jump codes. The operation platform refers to a hardware and software platform that may execute the user code. Exemplary operation platforms may include an X86 platform, an advanced RISC machine (ARM) platform, an Intel platform, an advanced micro devices (AMD) platform, or the like, or any combination thereof. For different operation platforms, codes for implementing the same function may be different. For example, in the X86 platform, the jump instruction may be JMP with a length of 5 bytes. As another example, the jump instruction on the ARM platform may be b with a length of 4 bytes. In some embodiments, the first macro may include one more codes for implementing the same function on different operation platforms. For example, the first macro may include different codes for determining or implementing the jump instruction on the X86 platform and the ARM platform. In some embodiments, to generate a jump code, the processing device 500 may determine the operation platform on which the user code is executed. Further, the processing device 500 may generate the jump code based on the code in the first macro and the operation platform. For example, if the operation platform of the user code is the X86 platform, the processing device 500 may generate the jump instruction "jmp rel_addr" with a length of 5 bytes. As another example, if the operation platform of the user code is the ARM platform, the processing device 500 may generate the jump instruction "b rel_addr" with a length of 4 bytes.

In 620, the processing device 500 (e.g., the obtaining module 520) may obtain, based on a second macro of the user code, target information for identifying an execution condition of the one or more branch codes.

In 630, the processing device 500 (e.g., the determination module 530) may determine, based on the assembly code and the target information, a compiled user code. The compiled user code refers to a compiled or optimized code corresponding to the user code. In some embodiments, the processing device 500 may obtain the compiled user code by performing operation 610 and operation 620 using a compiler (e.g., the compiler 120). The compiled user code may include the assembly code and the target information.

The second macro may be used to receive information such as a variable name, an identity of a storage address, or the like, or any combination thereof. In some embodiments, the second macro may include a default value of the information. When the second macro receives empty information (e.g., no information is received), the default value may be used. In some embodiments, the second macro may include one or more parameters. The target information may be introduced into the second macro as the one or more parameters thereof. In such cases, the processing device 500 may obtain the target information based on the one or more parameters of the second macro. In some embodiments, the second macro and the first macro may be the same macro that includes all the functions of the first macro and the second macro. For example, the macro may include a plurality of parameters. A portion of the plurality of parameters may be used to receive the one or more branch codes, and another portion of the plurality of parameters may be used to receive the target information.

The target information refers to pre-determined information (e.g., information pre-determined by a user) that is used for determining a jump path. The processing device 500 may determine, based on the target information, a storage address used during an execution of a code (e.g., the compiled user code). For example, the target information may include a global variable name, a static variable name, a static storage address identifier, or the like, or any combination thereof. Correspondingly, the storage address determined based on the target information may include a storage address of a variable, etc.

In some embodiments, the target information may be used for identifying an execution condition of the one or more branch codes. When the compiled user code is executed, the compiled user code may call, based on the target information, a procedure to determine a value of the execution condition. In some embodiments, the value of the execution condition may be a jump instruction. The target information may be used for identifying the jump instruction. For example, the target information may identify a storage address for storing an address of the jump instruction. When the compiled user code is executed, the compiled user code may call, based on the target information, a procedure to determine a value of the execution condition. In the procedure, a modified jump instruction may be generated. The modified jump instruction may be used to replace an original jump instruction in the address of the jump instruction. In such cases, the compiled user code may jump to a branch based on the modified jump instruction. Correspondingly, the execution flow of the compiled user code may be modified according to the procedure. Merely by way of example, the target information may include a variable identifying the execution condition. A value of the variable may be set to be a value corresponding to a specified branch by calling the preset procedure. In such cases, the compiled user code may jump to a corresponding branch based on the value of the variable. For instance, if the value of the variable corresponding to a branch A is 1, and the value of the variable corresponding to a branch B is 2, in the procedure, the value of the variable corresponding to the branch A may be set to be 1, and the value of the variable corresponding to the branch B may be set to be 2. As another example, the target information may identify a storage address that may store the address the jump instruction. The compiled user code may determine the address of the jump instruction based on the target information by calling the procedure. Further, the jump instruction may be modified to generate a modified jump instruction in the procedure. The modified jump instruction may be used to cause the compiled user code to jump to a new branch. For example, the (initial) jump instruction may be used to cause the compiled user code to jump to branch A, and the modified jump instruction may be used to cause the compiled user code to jump to branch B. In such cases, the execution flow of the compiled user code may be modified according to the procedure.

In some embodiments, to obtain the target information, the processing device 500 may determine whether a parameter of the second macro includes the target information. In response to determining that the parameter of the second macro includes the target information, the processing device 500 may determine the target information based on the parameter of the second macro. In response to determining that the second macro does not include a parameter that includes the target information, the processing device 500 may determine predetermined information as the target information. The predetermined information may be included in the second macro, or may be predetermined and stored in a storage device.

In some embodiments, at least one of the one or more jump codes in the assembly code may include a code segment generated based on the first macro and a jump instruction. The code segment may be generated based on one or more codes in the first macro. The one or more codes in the first macro may include a code for calling the jump instruction, or other codes for jumping to a branch (e.g., a code for identifying a start of a branch code). Merely by way of example, a pseudocode corresponding to the jump code may include:
L4: jumping to L6
L5: jumping to L9
L6: label A
L7: branch code of branch A
L8: jumping to L11
L9: label B
L10: branch code of branch B
L11: label,
where L4 and L5 are jump instructions for jumping to branch A and branch B, respectively, L6 and L9 are codes for identifying starts of branch A and branch B, respectively. As used herein, the pseudocode refers to plain language description of a code (e.g., the jump code), which is intended for human reading.

In some embodiments, at least one of the one or more jump codes may include a code configured to write operation address information into the storage address identified by the target information. In some embodiments, the operation address information may include an address of an instruction that is executed currently. For example, the operation address information may include a program counter (PC) register address. Merely by way of example, a pseudocode corresponding to the jump code may include:
L1: nop instruction,
L2: writing the PC register address into C,
where L1 is a dling instruction for reserving an instruction space, C refers to a storage address identified by the target information, the PC register address may identify an address of the instruction L2 that is executed currently. In some embodiments, instruction L2 may be used to store the PC register address. In some embodiments, instructions L1 and L2 may be used to store the PC register address.

In some embodiments, the jump instruction may be configured to cause the assembly code (or the compiled user code) to jump to a corresponding assembly branch code of the one or more assembly branch codes based on the target information. For example, an address of the jump instruction may be a value in the storage address identified by the target information. The processing device 500 may determine the jump instruction based on the value in the storage address. Further, the processing device 500 may cause the assembly code (or the compiled user code) to jump to the corresponding assembly branch code based on the jump instruction.

In some embodiments, the at least one of the one or more jump codes may include a code configured to write the jump instruction into the storage address. The processing device 500 may write the jump instruction into the storage address based on the code. Merely by way of example, a pseudocode corresponding to the jump code may include:
L3: modifying L2 to jump to L4,
where the storage address identified by the target information may store an address of L2, and the modified L2 may store a jump instruction for jumping to L4.

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the jump code corresponding to two branches (branch A and branch B) is provided in the process 600 as an example. In some embodiments, the code optimization method may be used in a user code that includes three or more branches, a user code that includes one or more loops, or the like, or any combination thereof.

Merely by way of example, for a user code that includes three branches A, B, and C, a pseudocode corresponding to the jump code may include:
L1: nop instruction,
L2: writing the PC register address into C,
L3: modifying L2 to jump to L4,
L4: jumping to L7
L5: jumping to L10
L6: jumping to L13
L7: label A
L8: branch code of branch A
L9: jumping to L15
L10: label B
L11: branch code of branch B
L12: jumping to L15
L13: label C
L14: branch code of branch C
L15: label,
where L8, L11, and L14 are branch codes corresponding to branch A, branch B, and branch C, respectively. When the compiled user code is executed, the compiled user code may call a procedure to modify a jump instruction in L2 for jumping to L4, L5, or L6.

As another example, for a user code that includes a loop, a pseudocode corresponding to the jump code may include:
L1: nop instruction,
L2: writing the PC register address into C,
L3: modifying L2 to jump to L4,
L4: jumping to L7
L5: jumping to L10
L6: jumping to L13

L7: label A
L8: loop code of the loop
L9: jumping to L15
L10: label B
L11: nop instruction
L12: jumping to L7
L13: label where L8 is a loop code of the loop, L13 is a start of a code outside the loop. The loop code in L8 may be executed repeatedly during the execution of the compiled user code. And when the loop is to be terminated, a procedure may be called to modify a jump instruction in L2 for jumping to L13.

Figure 7:
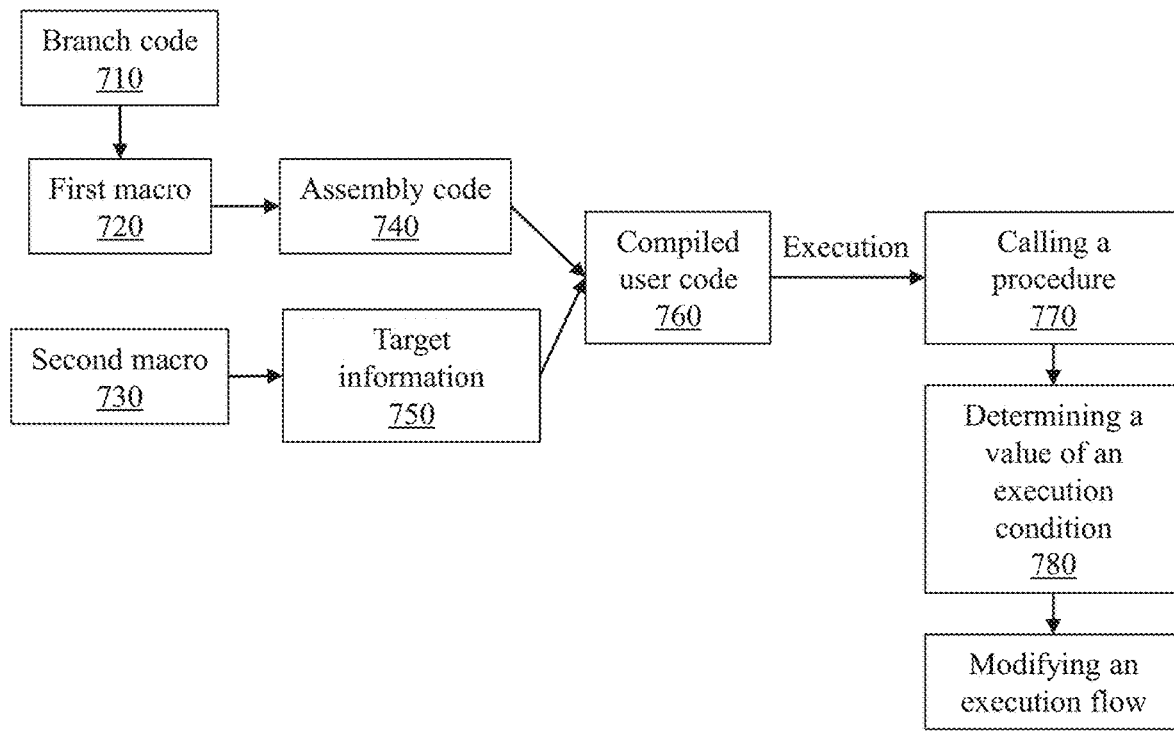
FIG. 7 is a schematic diagram illustrating an exemplary process for code optimization according to some embodiments of the present disclosure.

FIG. 7 is a schematic diagram illustrating an exemplary process for code optimization according to some embodiments of the present disclosure. In some embodiments, the process 700 illustrated in FIG. 7 may be used for optimizing a user code, thereby implementing a branch taken process. In some embodiments, the process 700 may be implemented by a code optimization system (e.g., the code optimization system 100). In some embodiments, the code optimization system may be implemented by software and/or hardware, and/or may be integrated in a code optimization device. In some embodiments, at least part of process 700 may be performed by the processing device 500 (implemented in, for example, the computing device 400 shown in FIG. 4). In some embodiments, at least part of process 700 may be performed by the processing device 500 using a compiler (e.g., the compiler 120).

For example, as illustrated in FIG. 7, the compiler 120 may receive one or more branch codes 710 using a first macro 720 in the user code. Further, the compiler 120 may generate an assembly code 740 based on the first macro 720. The assembly code 740 may include one or more assembly branch codes corresponding to the one or more branch codes and one or more jump codes corresponding to the one or more assembly branch codes. The compiler 120 may obtain target information 750 based on a second macro 730 in the user code. In such cases, a compiled user code 760 including the assembly code 740 and the target information 750 may be generated. The target information 750 may be used for identifying an execution condition of the one or more branch codes. When the compiled user code 760 is executed, as illustrated in 770, the compiled user code 760 may call, based on the target information, a procedure to determine a value of the execution condition in 780.

In some embodiments, the value of the execution condition may be a jump instruction. The target information may be used for identifying the jump instruction. For example, the target information may identify a storage address for storing an address of the jump instruction. When the compiled user code is executed, the compiled user code may call, based on the target information, a procedure to determine a value of the execution condition. In the procedure, a modified jump instruction may be generated. The modified jump instruction may be used to replace an original jump instruction in the address of the jump instruction. In such cases, the compiled user code 760 may jump to a branch based on the modified jump instruction. Correspondingly, the execution flow of the compiled user code 760 may be modified according to the procedure. Merely by way of example, the target information may include a variable identifying the execution condition. A value of the variable may be set to be a value corresponding to a specified branch by calling the preset procedure. In such cases, the compiled user code 760 may jump to a corresponding branch based on the value of the variable. For instance, if the value of the variable corresponding to a branch A is 1, and the value of the variable corresponding to a branch B is 2, in the procedure, the value of the variable corresponding to the branch A may be set to be 1, and the value of the variable corresponding to the branch B may be set to be 2. As another example, the target information may identify a storage address that may store the address of the jump instruction. The compiled user code 760 may determine the address of the jump instruction based on the target information by calling the procedure. Further, the jump instruction may be modified to generate a modified jump instruction in the procedure. The modified jump instruction may be used to cause the compiled user code 760 to jump to a new branch. For example, the (initial) jump instruction may be used to cause the compiled user code 760 to jump to branch A, and the modified jump instruction may be used to cause the compiled user code 760 to jump to branch B. In such cases, the execution flow of the compiled user code 760 may be modified according to the procedure.

Figure 8:
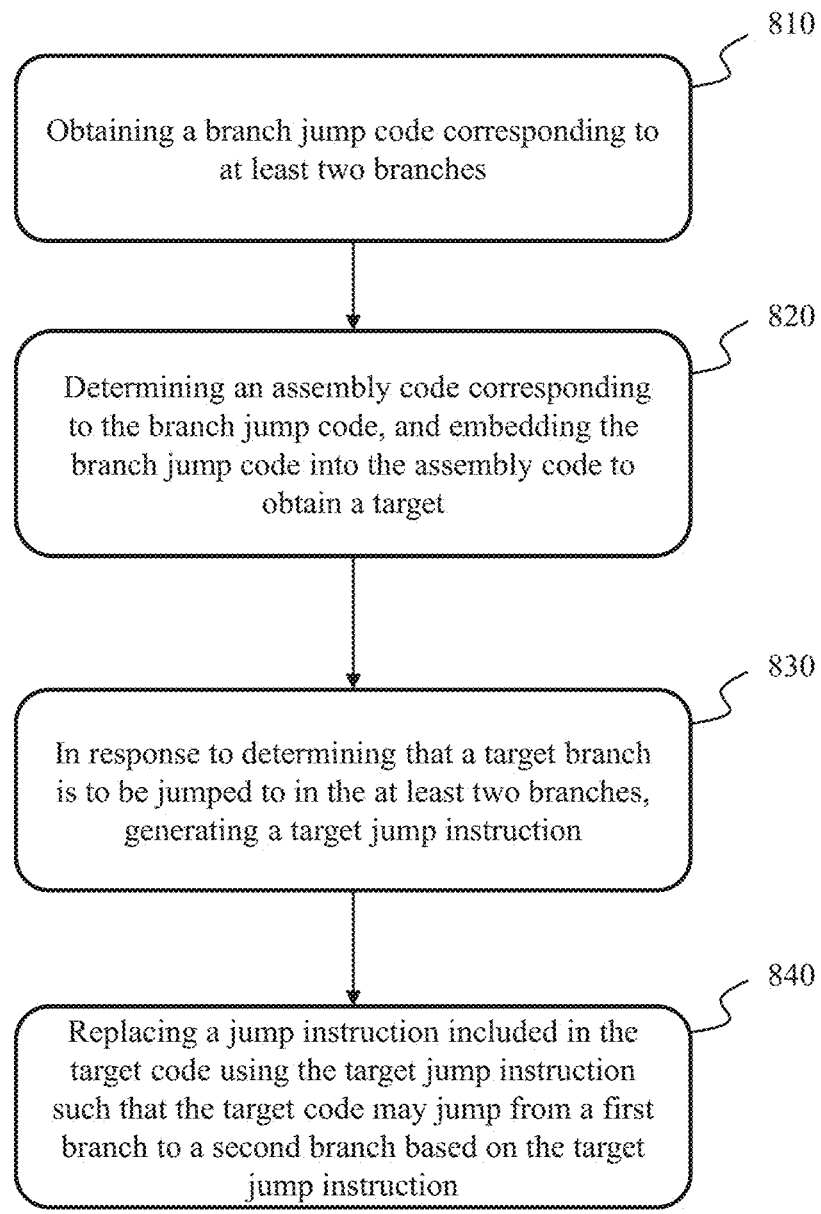
FIG. 8 is a schematic diagram illustrating an exemplary process for branch taken according to some embodiments of the present disclosure.

FIG. 8 is a schematic diagram illustrating an exemplary process for branch taken according to some embodiments of the present disclosure. In some embodiments, the process 800 illustrated in FIG. 8 may be performed based on the code optimization process 700 illustrated in FIG. 7. In some embodiments, at least part of process 800 may be performed by the processing device 500 (implemented in, for example, the computing device 400 shown in FIG. 4). In some embodiments, at least part of process 800 may be performed by the processing device 500 using a compiler (e.g., the compiler 120).

In 810, a branch jump code may be obtained. The branch jump code may correspond to at least two branches.

In some embodiments, the branch jump code may include a code input by a user. For example, the branch jump code may be written in programming languages such as C, C++, etc. In some embodiments, the branch jump code may include a storage address and a default branch. For example, the branch jump code provided by the user may include two code segments corresponding to two branches A and B in which branch A is determined as the default branch, and a region C (also referred to as a "storage address") for storing an address.

In 820, an assembly code corresponding to the branch jump code may be determined. The branch jump code may be embedded into the assembly code such that a target code (also referred to as a "compiled user code") may be obtained. The assembly code may be used to implement a jumping between the at least two branches.

In some embodiments, the assembly code including certain features may be generated based on the branch jump code provided by the user. In some embodiments, the branch jump code may be embedded into a user code based on an internal assembly technique. That is, the assembly code may be generated based on the inline assembly technique. The inline assembly may be modified using a volite keyword to prevent the compiler from over-optimizing the assembly code. Table 1 is a table illustrating a pseudocode corresponding to the branch jump code in an assembly process. Each code included in the branch jump code may be embedded into a corresponding position in Table 1 to obtain the target code.

TABLE 1

| Label of instructions | Pseudo instruction | Description |
| --- | --- | --- |
| L1 | nop instruction | A dling instruction for reserving an instruction space for devices using complex instruction sets since a length of L2 may not satisfy the requirements of a length of the jump instruction. L1 may be unnecessary for devices using simplified instruction sets, and L2 may be directly modified to jump to another instruction |
| L2 | Writing a PC register address into C | C may be used to directly locate the code generated in the present disclosure. A value stored in C may be a position of the L1/L2 |
| L3 | Modifying L1/L2 to jump to L4 | Avoiding excessive execution of L2 |
| L4 | Jumping to L6 | Unconditionally executing branch A |
| L5 | Jumping to L9 | Unconditionally executing branch B |
| L6 | Label A | Identifying a start of branch A |
| L7 | Branch code of branch A | Embedding the branch code into an approach A of a user code (supposing there are m instructions) |
| L8 | Jumping to L11 | Avoiding execution of branch B |
| L9 | Label B | Identifying a start of branch B |
| L10 | Branch code of branch B | Embedding the branch code into an approach A of a user code |
| L11 | Label | Skipping execution of branch B |

According to Table 1, a modified L1 may point to L4 or L5, rather than directly point to L6 or L9. A possible reason may be that the assembly code is generated based on the inline assembly technique statically, a distance between L1 and L9 may not be calculated directly, accordingly, a relative jump instruction may not be used to implement a jump. While when L4/L5 is used as a transit, a distance between L1 and L4/L5 is fixed, which may facilitate a calculation of a distance between L1 and L4/L5 and a modification of L1.

In some embodiments, to determine the assembly code corresponding to the branch jump code and embed the branch jump code into the assembly code to obtain the target code, branch approach codes (also referred to as "branch codes") corresponding to each branch in the branch jump code may be determined; each branch approach code may be further embedded into an instruction position corresponding to the branch in the assembly code. For example, a branch approach code of branch A may be embedded into L7 in Table 1, a branch approach code of branch B may be embedded into L10 in Table 1, and the jump instructions of branch A and branch B may be embedded into L4 and L5, respectively. Further, the assembly code embedded with the branch approach codes may be determined as the target code.

In 830, in response to determining that a target branch is to be jumped to in the at least two branches, a target jump instruction (also referred to as a "modified jump instruction") may be generated. The target jump instruction may be used to cause the target code to jump to the target branch.

In some embodiments, to generate the target jump instruction for causing the target code to jump to the target branch, a type of a processor executing the branch jump code (or an operation platform of the ranch jump code) may be determined. Further, the target jump instruction may be generated based on the type of the processor. In some embodiments, the generation of the target jump instruction may involve an encoding of an instruction set, which may be closely related to the processor and an endian (e.g., a big-endian or a little-endian). Accordingly, the target jump instruction may be determined based on the type of the processor. In some embodiments, the target jump instruction may be generated based on the type of the processor using a compiler (e.g., the compiler 120). In some embodiments, when a branch taken process is to be performed to switch a branch during an execution of the target code, the jump address (i.e., an address of the jump instruction) may be located directly according to the region C, and the jump instruction of L1 may be modified to jump to L4 or L5. In such cases, code segments in the target code may be modified directly, which may reduce the program overhead. A traditional branch taken process may rely on data access and instruction access, and cache hits may be invalidated during the data access. In some embodiments of the preset disclosure, the branch taken process may not rely on additional data access (which removes data access overhead), and the invalidated cache hits during the data access may not be introduced, which may be more efficient than the traditional branch taken process that uses global variables, state machines, function pointers, etc. Table 2 is a table illustrating a pseudocode corresponding to the target jump instruction in an assembly process.

TABLE 2

| Label of instructions | Pseudo instruction | Description |
| --- | --- | --- |
| S1 | Reading a value of C | Determining a position of the target code |
| S2 | Generating a modified jump instruction (target jump instruction) | Determining a machine code of the jump instruction during execution, a length of the machine code may be within a CacheLine, and a length of S2 <= a length L1 + L2 |
| S3 | Replacing an original jump instruction using the modified jump instruction | S3 may change an execution flow of the target code. For platforms without an ICache, the replacement of the jump instruction may be atomic from a perspective of the CPU since the instruction length is within a CacheLine. For platforms with the instruction cache, an instruction cache has not been refreshed such that the replacement in memory is safe |
| S4 | Refreshing ICache and BTB | S4 may refresh the instruction cache to finish the replacement, which may cause a rebuilding of the pipeline |

In some embodiments, the replacement of the jump instruction using the target jump instruction may be repetitive and atomic, which may allow any count of modifications or replacements during an execution of the target code and may not cause an abnormal execution flow. As used herein, the ICache refers to an instruction cache in the CPU, which is used to accelerate increase the instruction throughput efficiency of the CPU and reduce the memory access. BTB, branch target buffer, refers to a target address of a branch to jump to (e.g., a target branch), which affects a branch prediction module in the CPU.

In some embodiments, to generate the target jump instruction based on the type of the processor, a machine code corresponding to the type of the processor may be determined. Further, an instruction distance between a jump instruction and an idle instruction in the target code may be determined. Further, the target jump instruction may be generated based on the instruction distance and the machine code. In some embodiments, different types of processors may correspond to different machine codes. Exemplary types of processors (or platforms) may include, X86, X86-64, ARM, AARCH64, etc.

In the X86 processor, a jump instruction jmp may be allowed to directly jump within an addressing range of 4

GB. The jump instruction may be in a form of jmp rel_addr for jumping, wherein rel_addr is equal to an instruction distance between L1 and L4/L5 minus 5 bytes. A length of jmp rel_addr may be 5 bytes, correspondingly, at least 5 bytes of space may be provided between L1 and L2. An encoding format of the jmp rel_addr may be:

| (1 byte) 0xE9 | (4 bytes) rel_addr |
|---|---| where 0xE9 is a machine cat of the x86 processor, an address offset may be the instruction distance between L1 and L4/L5.

In the X86-64 processor, an instruction set of X86-64 may be compatible with X86. In such cases, an X86 program may be multiplexed by X86-64.

In the ARM processor, a jump instruction b may be allowed to directly jump within an addressing range of 32 MB. The jump instruction may be in a form of b rel_addr for jumping, where rel_addr is an instruction distance between L1 and L4/L5. The ARM is a streamlined instruction set with a fixed length of 4 bytes. Thus, L1 is unnecessary and may be deleted in the inline assembly. An encoding format of the b rel_addr may be:

| (1 byte) 0xEA | (3 bytes) an address offset is subtracted by 8 and shifted to the right by 2 bits |
|---|---|

In the aarch64 processor, an instruction set of aarch64 may be compatible with ARM. In such cases, an ARM program may be multiplexed by aarch64.

In 840, after the target jump instruction is generated, a jump instruction included in the target code may be replaced using the target jump instruction such that the target code may jump from a first branch to a second branch (i.e., the target branch) based on the target jump instruction.

In some embodiments, to replace the jump instruction included in the target code using the target jump instruction, an address of the jump instruction (or an original jump instruction) may be determined. Further, the jump instruction may be replaced using the target jump instruction. In some embodiments, the replacement of the target jump instruction using the jump instruction may be finished by performing a refresh instruction. For example, after the jump instruction is replaced using the target jump instruction, an operation platform of the jump instruction may be determined. Further, whether to generate a refresh instruction may be determined based on the operation platform. For example, the refresh instruction may not be generated for an operation platform (e.g., the X86) that supports automatic refresh. And a refresh instruction may be generated for an operation platform that needs the refresh instruction based on a type of the operation platform (e.g., an instruction set supported by the CPU).

In some embodiments, to cause the target code to jump from the first branch to the second branch based on the target jump instruction, an instruction cache for caching the target jump instruction and a target address of the second branch may be determined. Further, the instruction cache and the target address may be refreshed such that the target code may jump from the first branch to the second branch based on the target jump instruction. In some embodiments, to refresh the instruction cache and the target address, the instruction cache and the target address may be refreshed based on a target function and/or a target refresh instruction.

For example, on the ARM/aarch64 platform, the ICache and the BTB may be refreshed. For instance, for the GCC/CLANG compiler, the refresh operation may be performed using a built-in function (e.g., _builtin_clear_cache) of the GCC/CLANG compiler. For other compilers, after 0 is written to the r0 register, the ICache may be refreshed using mcr P15, 0, R0, C7, C1, 0, and the BTB may be refreshed using mcr P15, 0, R0, C7, C5, 0.

Figure 9:
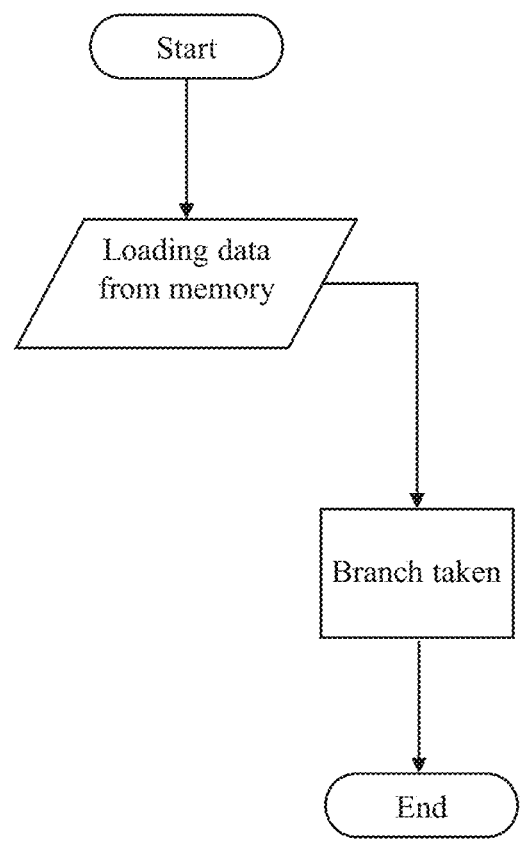
FIG. 9 is a flowchart illustrating an exemplary process for branch taken according to some embodiments of the present disclosure.
Figure 10:
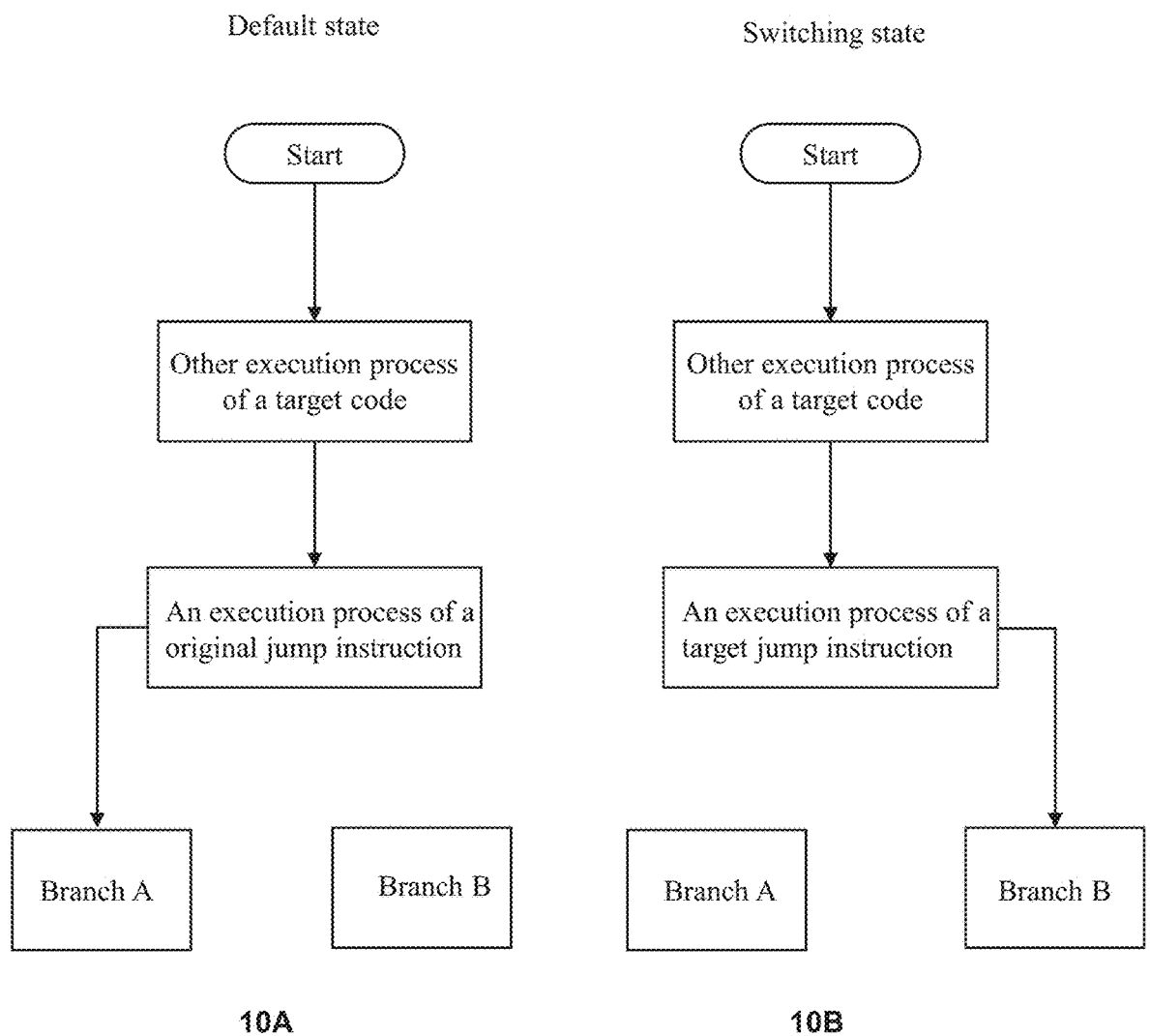
FIG. 10 is a flowchart illustrating an exemplary process for jumping to a branch according to some embodiments of the present disclosure.

FIG. 9 is a flowchart illustrating an exemplary process for branch taken according to some embodiments of the present disclosure. As illustrated in FIG. 9, after the original jump instruction is replaced using the target jump instruction, the target jump instruction may be loaded directly from the memory to implement a jump. That is, the branch taken may be performed directly without loading data from the memory or calculating a branch to be taken, which may avoid excessive overhead, reduce the clock delay in the processor, thereby improving the efficiency and speed of the branch taken process. FIG. 10 is a flowchart illustrating an exemplary process for jumping to a branch according to some embodiments of the present disclosure. As illustrated in FIG. 10, in a default state, a default branch may be branch A. A target code may be currently executed according to 10A without performing a branch prediction. When a branch B is determined to be jumped to, an original jump instruction in the target code may be replaced using a target jump instruction corresponding the branch B. The replacement may be finished by performing a refresh instruction. Further, in a switching state, the target code may be executed according to 10B based on the target jump instruction.

Taking a target code in C/C++ as an example, the branch taken process may be removed by dynamically modifying the target code during the execution of the target code, which may avoid the reconstruction of the pipeline. A technical characteristic of an executable file (or a dynamic library, a static library) of the target code in a non-execution period may include that the same function may include a PC register reading operation x followed by an unconditional jump instruction. The unconditional jump instruction may be used to cause the target code to jump to an adjacent address in the same function. An assembly instruction in the adjacent address may further jump to another address unconditionally. The technical characteristic may facilitate more precise locating compared with a traditional branch taken process. In the traditional branch taken process, the execution flow of the target code may not be related to the PC register. Meanwhile, in the traditional branch taken process, two unconditional jump instructions for jumping to adjacent addresses may be optimized due to a compiler optimization.

According to the process 800 provided in the present disclosure, a branch jump code may be obtained and the assembly code corresponding to the branch jump code may be determined. The branch jump code may be embedded into the assembly code such that a target code may be obtained. When a target branch is determined to be jumped to in the at least two branches, a target jump instruction for causing the target code to jump to the target branch may be generated. An original jump instruction may be replaced using the target jump instruction such that the target code may jump from a first branch to a second branch. In such cases, the target code may jump to the second branch without performing a branch prediction. The execution flow of the target code may be modified during the execution of the target code, and the branch taken process relies the global state may be completely removed, which may avoid the reconstruction of the pipeline and improve the program performance.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
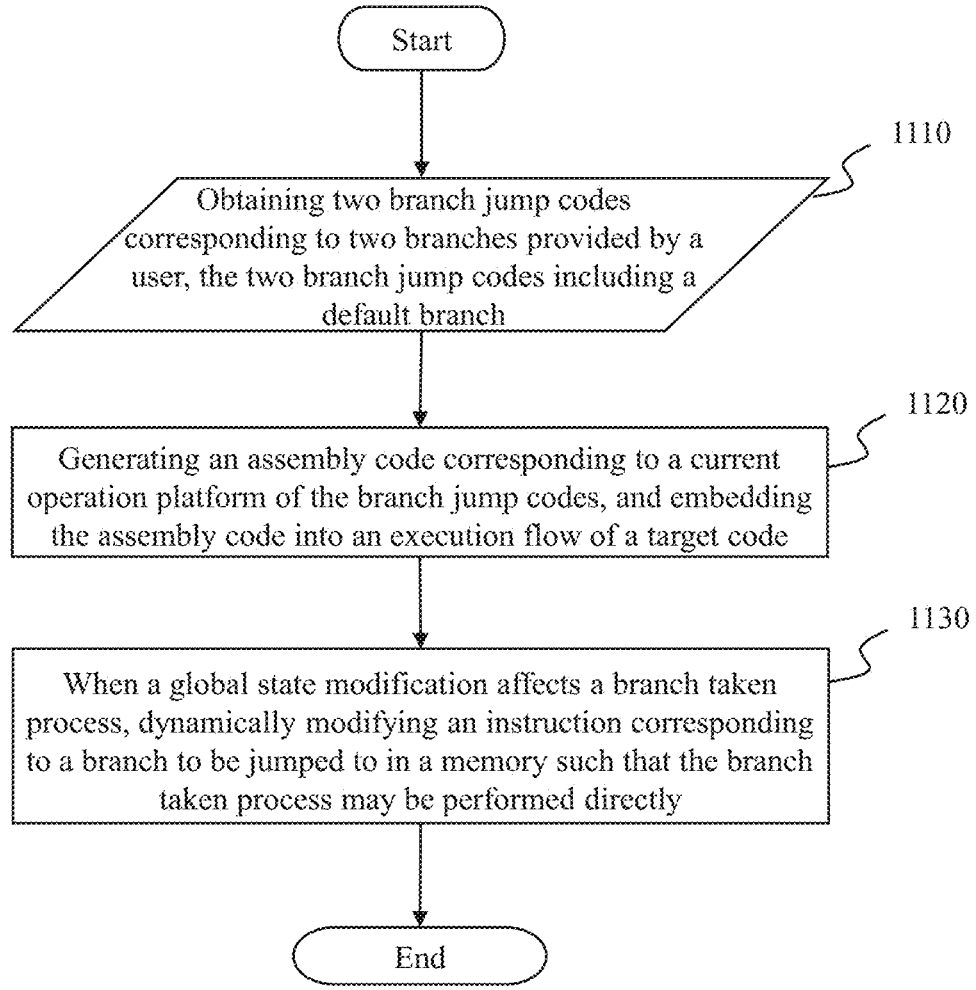
FIG. 11 is a schematic diagram illustrating an exemplary process for branch taken according to some embodiments of the present disclosure.

FIG. 11 is a schematic diagram illustrating an exemplary process for branch taken according to some embodiments of the present disclosure. In some embodiments, the process 1100 illustrated in FIG. 11 may be performed based on the code optimization process 700 illustrated in FIG. 7. In some embodiments, at least part of process 1100 may be performed by the processing device 500 (implemented in, for example, the computing device 400 shown in FIG. 4). In some embodiments, at least part of process 1100 may be performed by the processing device 500 using a compiler (e.g., the compiler 120).

In 1110, two branch jump codes corresponding to two branches provided by a user may be obtained. The two branch jump codes may include a default branch determined by the user.

In 1120, an assembly code corresponding to a current operation platform of the branch jump codes may be generated and embedded into an execution flow of a target code.

In 1130, when a global state modification affects the branch taken process, an instruction corresponding to a branch to be jumped to in the memory may be dynamically modified such that the branch taken process may be performed directly.

A specific pseudocode may be used to compare a branch taken process in the present disclosure and a branch taken process in the prior art. Table 3 is a table illustrating the pseudocode corresponding to a branch taken process.

TABLE 3

| Prerequisite | A variable A and a variable B |
|---|---|
| Operation | Comparing A and B |
| Result | If A is larger than B, executing branch_a, otherwise executing branch_b |

A pseudocode from a perspective of the CPU in some embodiments may be:

```
Start:
    reading a value of A
    reading a value of B
    if A is larger than B,
        executing branch_a
    otherwise
        executing branch_b
End
```

A pseudocode from a perspective of the CPU in the present disclosure may be:

```
Start:
    executing branch_a
End
```

When values of the variables change such that A is not larger than B, an original jump instruction may be replaced using a target jump instruction. In such cases, the pseudocode from a perspective of the CPU in the present disclosure may be:

```
Start:
    executing branch_b
End
```

In some embodiments, a time point for using the target jump instruction may be that the value of the variable A or the variable B is modified, and a desired branch to be jumped to changes. In some embodiments, when the values of the variables change such that A is larger than B again, a target jump instruction may be generated again and the last jump instruction may be replaced using the target jump instruction. Correspondingly, the pseudocode from a perspective of the CPU may be:

```
Start:
    executing branch_a
End
```

In some embodiments, one of the applications where the branch taken may be applied may be a parallel access in a single case mode. In the parallel access, a lock may be used for inspection and protection to implement a safe initialization, which may reduce the access efficiency of the parallel access in the single case mode. In some embodiments of the present disclosure, an execution flow of the target code may be modified by modifying the jump instruction. In such cases, after a single-order initialization is complete, the protection of the lock may be bypassed, which may remove excess overhead.

Figure 12:
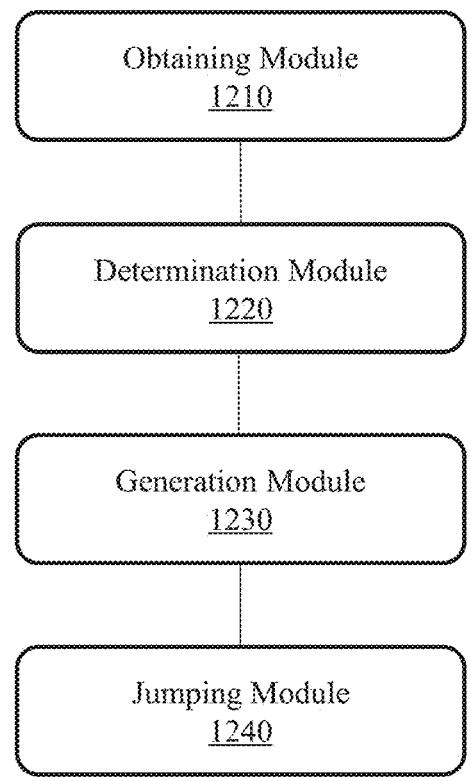
FIG. 12 is a block diagram illustrating an exemplary branch taken device according to some embodiments of the present disclosure.

FIG. 12 is a block diagram illustrating an exemplary branch taken device according to some embodiments of the present disclosure. As illustrated in FIG. 12, branch taken device 1200 may include an obtaining module 1210, a determination module 1220, a generation module 1230, and a jumping module 1240.

The obtaining module 1210 may be configured to obtain a branch jump code. The branch jump code may correspond to at least two branches.

The determination module 1220 may be configured to determine an assembly code corresponding to the branch jump code. The determination module 1220 may be configured further to embed the branch jump code into the assembly code to obtain a target code (also referred to as a "compiled user code"). The assembly code may be used to implement a jumping between the at least two branches.

In some embodiments, to determine the assembly code corresponding to the branch jump code and embed the branch jump code into the assembly code to obtain the target code, the determination module 1220 may determine branch approach codes (also referred to as "branch codes") corresponding to each branch in the branch jump code, and embed each branch approach code into an instruction position corresponding to the branch in the assembly code. Further, the determination module 1220 may determine the assembly code embedded with the branch approach codes as the target code.

The generation module 1230 may be configured to generate a target jump instruction in response to determining that a target branch is to be jumped to in the at least two branches. In some embodiments, to generate the target jump instruction for causing the target code to jump to the target branch, the generation module 1230 may determine a type of a processor executing the branch jump code (or an operation platform of the ranch jump code). Further, the generation module 1230 may generate the target jump instruction based on the type of the processor. In some embodiments, to generate the target jump instruction based on the type of the processor, the generation module 1230 may determine a machine code corresponding to the type of the processor. Further, the generation module 1230 may determine an instruction distance between a jump instruction and an idle instruction in the target code. Further, the generation module 1230 may generate the target jump instruction based on the instruction distance and the machine code.

The jumping module 1240 may be configured to, after the target jump instruction is generated, replace a jump instruction included in the target code using the target jump instruction such that the target code may jump from a first branch to a second branch (i.e., the target branch) based on the target jump instruction. In some embodiments, to replace the jump instruction included in the target code using the target jump instruction, the jumping module 1240 may determine an address of the jump instruction (or an original jump instruction). Further, the jumping module 1240 may replace the jump instruction using the target jump instruction. In some embodiments, to cause the target code to jump from the first branch to the second branch based on the target jump instruction, the jumping module 1240 may determine an instruction cache for caching the target jump instruction and a target address of the second branch. Further, the jumping module 1240 may refresh the instruction cache and the target address such that the target code may jump from the first branch to the second branch based on the target jump instruction. In some embodiments, to refresh the instruction cache and the target address, the jumping module 1240 may refresh the instruction cache and the target address based on a target function and/or a target refresh instruction.

It should be noted that each of the modules may be implemented by software or hardware. Merely by way of example, if implemented by hardware, the modules may be all located in the same processor, or the modules may be located in different processors in any combination.

Some embodiments of the present disclosure provide a computer-readable storage medium. The computer-readable storage medium may store computer instructions. The computer instructions may be executed by a processor to perform the methods of the present disclosure. In some embodiments, the computer-readable storage medium may include, but is not limited to, a USB flash drive, a read-only memory (ROM), a random access memory (RAM), a mobile hard drive, a magnetic disk, an optical disk, or other medium that may store computer programs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for code optimization, comprising:
at least one storage medium including a set of instructions; and
at least one processor in communication with the at least one storage medium, wherein when executing the set of instructions, the at least one processor is directed to cause the system to:
generate, based on a first macro of a user code, an assembly code corresponding to the user code, wherein the first macro includes one or more parameters relating to one or more branch codes, and the assembly code includes one or more assembly branch codes corresponding to the one or more branch codes and one or more jump codes corresponding to the one or more assembly branch codes;
obtain, based on a second macro of the user code, target information for identifying an execution condition of the one or more branch codes; and
determine, based on the assembly code and the target information, a compiled user code, wherein
when being executed, the compiled user code calls, based on the target information, a procedure to determine a value of the execution condition, wherein the procedure is configured to modify an execution flow of the compiled user code, and
at least one or more jump codes include a code segment generated based on the first macro and a jump instruction, the jump instruction being configured to cause the compiled user code to jump to a corresponding assembly branch code of the one or more assembly branch codes based on the target information.

2. The system of claim 1, wherein to generate, based on a first macro of a user code, an assembly code corresponding to the user code, the at least one processor is directed to cause the system to:
generate the assembly code based on an inline assembly technique.

3. The system of claim 1, wherein the at least one of the one or more jump codes includes a code configured to write operation address information into a storage address identified by the target information.

4. The system of claim 3, wherein the operation address information includes a program counter (PC) register address.

5. The system of claim 3, wherein to cause the compiled user code to jump to a corresponding assembly branch code of the one or more assembly branch codes based on the target information, the at least one processor is directed to cause the system to:
determine the jump instruction based on a value in the storage address; and
cause the assembly code to jump to the corresponding assembly branch code based on the jump instruction.

6. The system of claim 3, wherein the at least one of the one or more jump codes includes a code configured to write the jump instruction into the storage address.

7. The system of claim 1, wherein to obtain, based on a second macro of the user code, target information, the at least one processor is directed to cause the system to:
determine whether a parameter of the second macro includes the target information; and
in response to determining that the parameter of the second macro includes the target information, determine the target information based on the parameter of the second macro; or in response to determining that the second macro does not include a parameter that includes the target information, determine predetermined information as the target information.

8. The system of claim 1, wherein the compiled user code calling, based on the target information, a procedure to determine a value of the execution condition comprises:
    determining an address of an original jump instruction based on the target information;
    generating a modified jump instruction based on the address of the original jump instruction; and
    performing a replacement of the original jump instruction using the modified jump instruction.

9. The system of claim 8, wherein the performing the replacement of the original jump instruction using the modified jump instruction comprises:
    finishing the replacement of the modified jump instruction using the original jump instruction by performing a refresh instruction.

10. The system of claim 1, wherein to generate, based on a first macro of a user code, an assembly code corresponding to the user code, the at least one processor is directed to cause the system to:
    generate the one or more jump codes based on an operation platform of the one or more jump codes.

11. A method for code optimization, implemented on a computing device including at least one processor and at least one storage, comprising:
    generating, based on a first macro of a user code, an assembly code corresponding to the user code, wherein the first macro includes one or more parameters relating to one or more branch codes, and the assembly code includes one or more assembly branch codes corresponding to the one or more branch codes and one or more jump codes corresponding to the one or more assembly branch codes;
    obtaining, based on a second macro of the user code, target information for identifying an execution condition of the one or more branch codes; and
    determining, based on the assembly code and the target information, a compiled user code, wherein
        when being executed, the compiled user code calls, based on the target information, a procedure to determine a value of the execution condition, wherein the procedure is configured to modify an execution flow of the compiled user code, and
        at least one of the one or more jump codes include a code segment generated based on the first macro and a jump instruction, the jump instruction being configured to cause the compiled user code to jump to a corresponding assembly branch code of the one or more assembly branch codes based on the target information.

12. The method of claim 11, wherein the generating, based on a first macro of a user code, an assembly code corresponding to the user code comprises:
    generating the assembly code based on an inline assembly technique.

13. The method of claim 11, wherein the at least one of the one or more jump codes includes a code configured to write operation address information into a storage address identified by the target information.

14. The method of claim 11, wherein the obtaining, based on a second macro of the user code, target information comprises:
    determining whether a parameter of the second macro includes the target information; and
    in response to determining that the parameter of the second macro includes the target information, determining the target information based on the parameter of the second macro; or
    in response to determining that the second macro does not include a parameter that includes the target information, determining predetermined information as the target information.

15. The method of claim 11, wherein the compiled user code calling, based on the target information, a procedure to determine a value of the execution condition comprises:
    determining an address of an original jump instruction based on the target information;
    generating a modified jump instruction based on the address of the original jump instruction; and
    performing a replacement of the original jump instruction using the modified jump instruction.

16. The method of claim 15, wherein the performing the replacement of the original jump instruction using the modified jump instruction comprises:
    finishing the replacement of the modified jump instruction using the original jump instruction by performing a refresh instruction.

17. The method of claim 11, wherein the generating, based on a first macro of a user code, an assembly code corresponding to the user code comprises:
    generating the one or more jump codes based on an operation platform of the one or more jump codes.

18. A non-transitory computer readable medium, comprising executable instructions that, when executed by at least one processor, direct the at least one processor to perform a method, the method comprising:
    generating, based on a first macro of a user code, an assembly code corresponding to the user code, wherein the first macro includes one or more parameters relating to one or more branch codes, and the assembly code includes one or more assembly branch codes corresponding to the one or more branch codes and one or more jump codes corresponding to the one or more assembly branch codes;
    obtaining, based on a second macro of the user code, target information for identifying an execution condition of the one or more branch codes; and
    determining, based on the assembly code and the target information, a compiled user code, wherein
        when being executed, the compiled user code calls, based on the target information, a procedure to determine a value of the execution condition, wherein the procedure is configured to modify an execution flow of the compiled user code, and
        at least one of the one or more jump codes includes a code segment generated based on the first macro and a jump instruction, the jump instruction being configured to cause the compiled user code to jump to a corresponding assembly branch code of the one or more assembly branch codes based on the target information.

* * * * *